(12) United States Patent
Crocker et al.

(10) Patent No.: US 6,807,043 B2
(45) Date of Patent: Oct. 19, 2004

(54) APPARATUS FOR PROTECTING ELECTRONIC EQUIPMENT BY DETECTING THUNDER

(76) Inventors: Glenn Crocker, 231 Lindsey Pl., Marietta, GA (US) 30067; Jimmy Ray Freeman, P.O. Box 567, Edgewater, FL (US) 32132

( * ) Notice: Subject to any disclaimer, the term of this patent is extended or adjusted under 35 U.S.C. 154(b) by 0 days.

(21) Appl. No.: 10/067,110

(22) Filed: Feb. 6, 2002

(65) Prior Publication Data

US 2003/0147192 A1 Aug. 7, 2003

(51) Int. Cl.$^7$ ................................................. H01C 7/12
(52) U.S. Cl. ..................................... 361/118; 73/170.24
(58) Field of Search ......................... 324/72; 367/127; 73/170.24; 361/110, 111, 117, 118, 71, 18

(56) References Cited

FOREIGN PATENT DOCUMENTS

| JP | 08-17549 | * | 1/1996 |
| JP | 11-18285 | * | 1/1999 |

* cited by examiner

Primary Examiner—Shawn Riley

(57) ABSTRACT

A protection apparatus for protecting electrical and electronic equipment from damage due to disturbances introduced by external electrical conductors. The apparatus employs one or more of the following methods to switch an interfacing relay from the operating state to the protected state: Surge protection; detection of the sound of an approaching thunderstorm. The apparatus may include a means to manually select either the protected state in which the connected equipment is disconnected from the external conductors, the override state in which the connected equipment is connected to the external conductors and the sensing systems are overridden and the normal operating state in which the sensing systems are employed to automatically disconnect the equipment in the event of a disturbance.

7 Claims, 5 Drawing Sheets

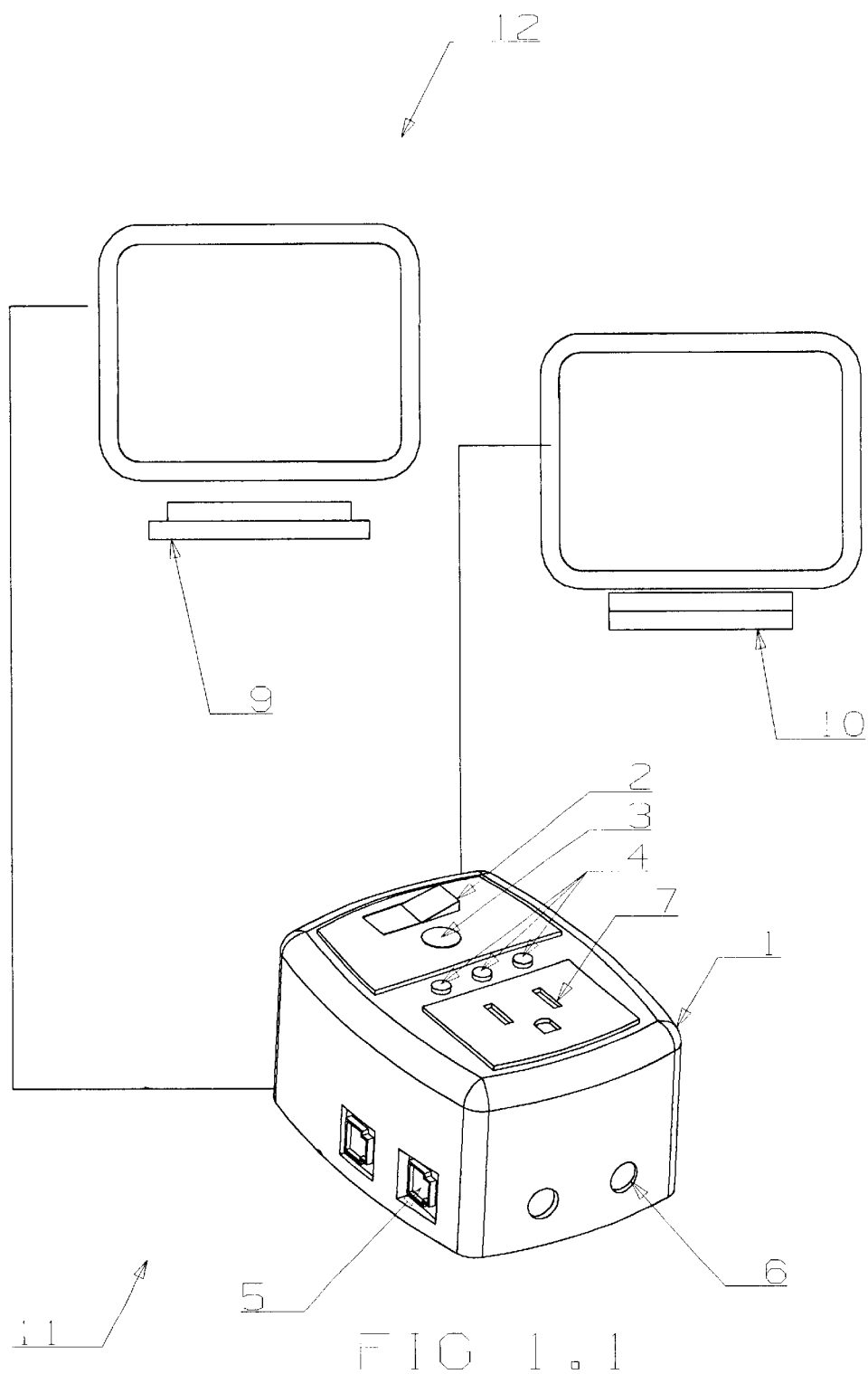
FIG 1.1

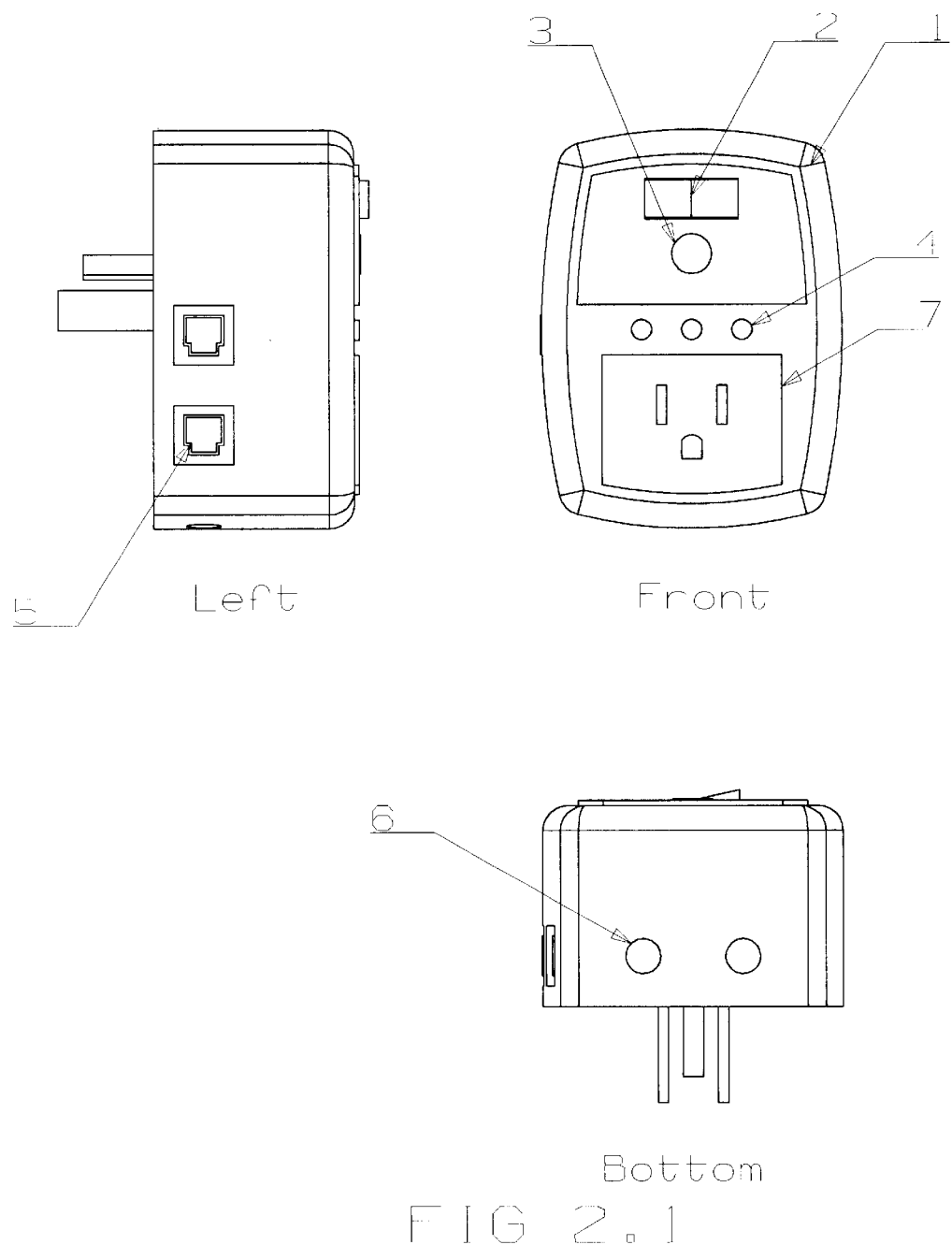
FIG 2.1

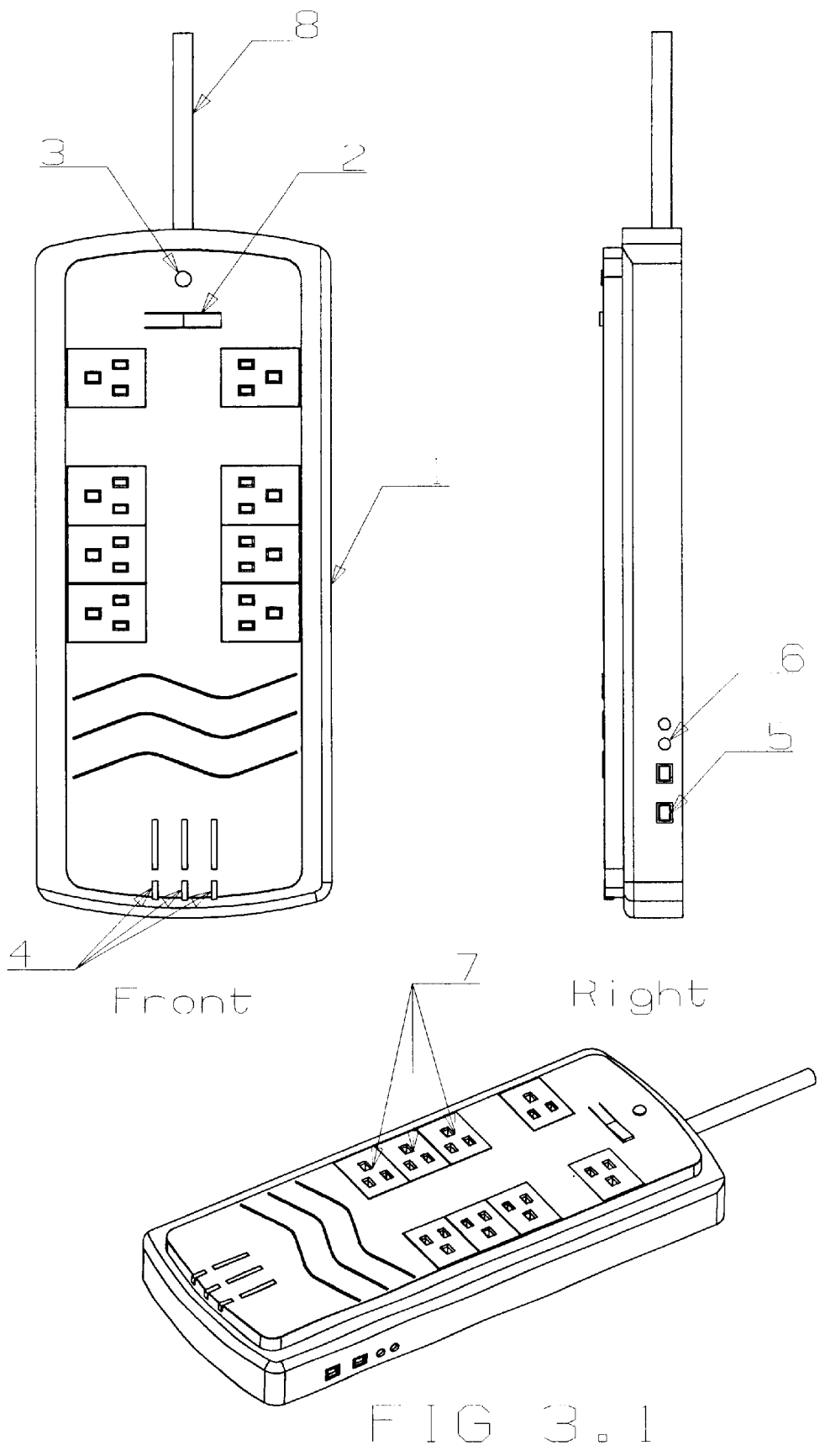
FIG 3.1

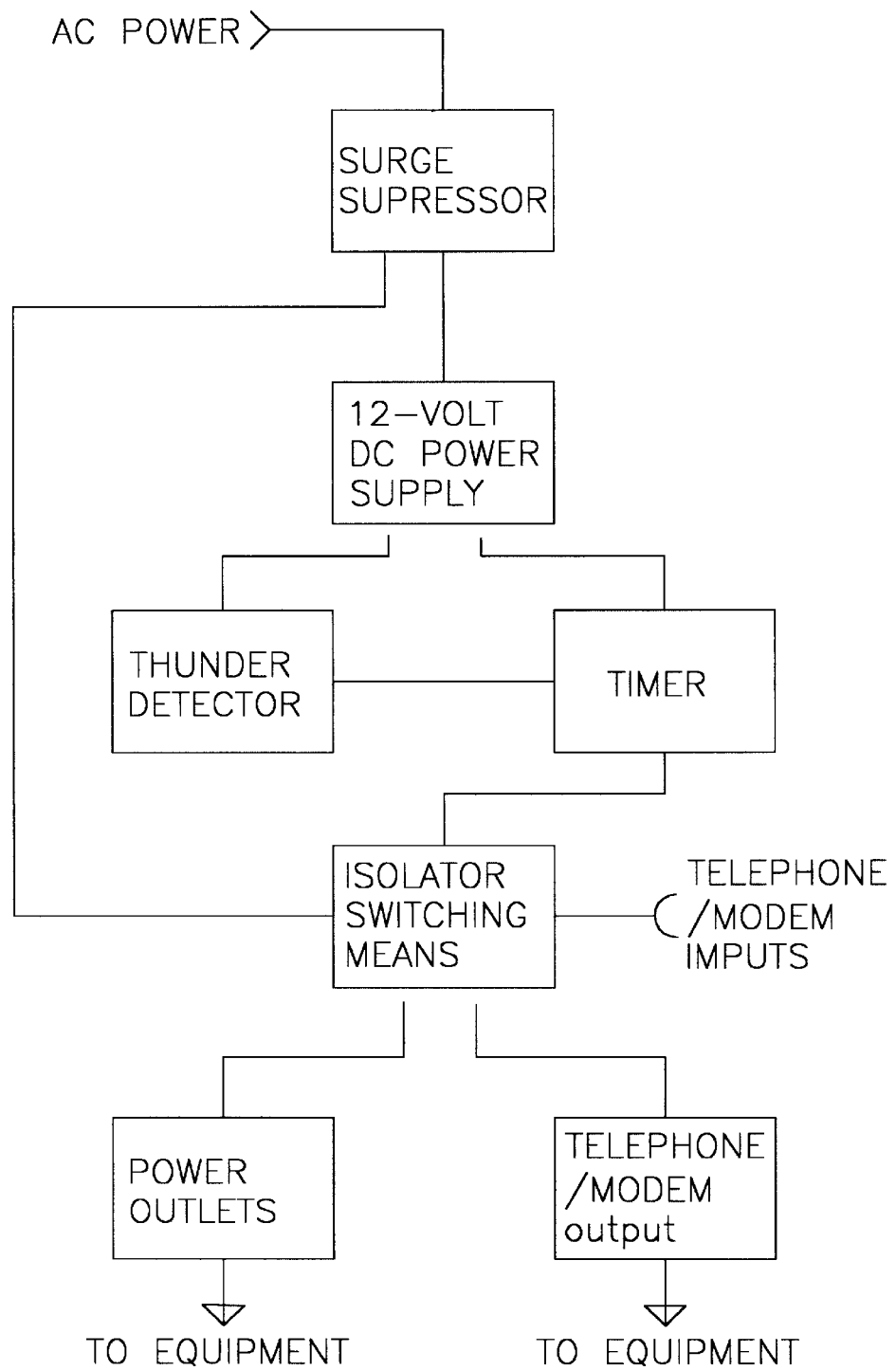
FIG 4.1

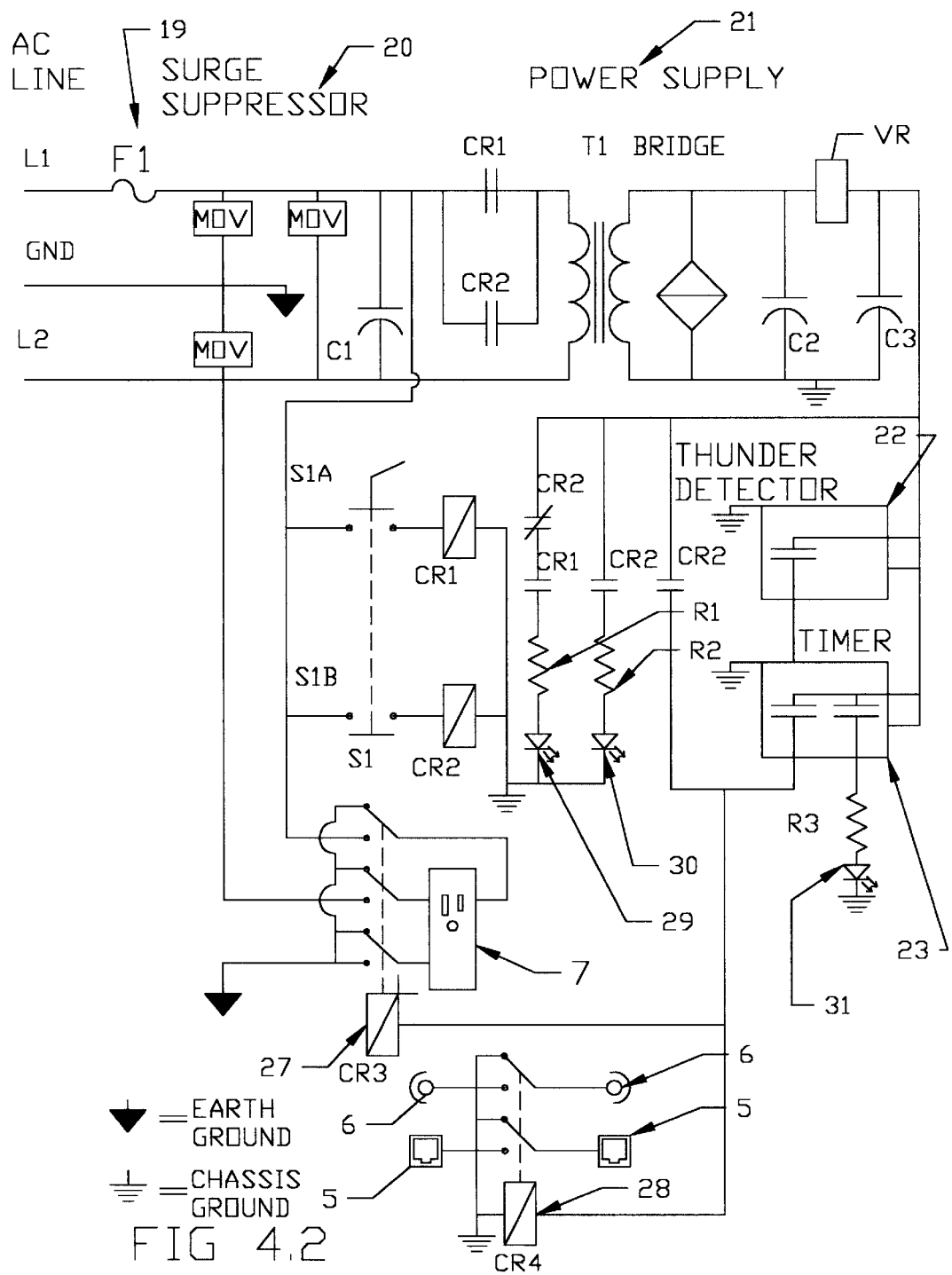
FIG 4.2

APPARATUS FOR PROTECTING ELECTRONIC EQUIPMENT BY DETECTING THUNDER

BACKGROUND OF THE INVENTION

Electrical and electronic equipment used in homes and offices require connections to power or signals which extend to outside sources. For example, many devices interface to external systems via such conductors as utility lines, telephone lines and remote antennas. Unfortunately, electronic equipment may also experience interference to normal operation or even catastrophic failure caused by disturbances and surges carried to the equipment via external conductors.

These disturbances are typically transient fluctuations, surges or spikes in voltage caused by the switching of large electrical loads sharing the power lines. Damaging disturbances may also be caused by irregularities in the power delivered by the utility company supplying the power. Occasionally, an extreme surge can be caused by a nearby lightning strike during a thunderstorm. In this case there is usually a dramatic rise in ground potential. One common protection scheme is to connect the equipment to the electrical grounding conductor. This practice subjects the equipment to this potentially damaging rising ground potential and renders conventional protection device ineffective.

The majority of these disturbances can be filtered out or trapped by using simple surge suppression technology or the use of uninterrupted power supplies (UPS). However, in the case of a lightning surge, conventional suppression devices typically do not provide a sufficient response time or have the energy dissipation capacity to adequately protect today's sensitive electronic appliances and equipment.

There are over 20 million thunderstorms each year in the USA. It is also estimated that there are about 100 million lightning strikes each second. Some types of protection devices turn off electronic equipment when it is not in use. Unfortunately, the electronic equipment is still subject to damage because it is still connected to the external conductors that may carry damaging electrical disturbances.

There have been many different approaches to dealing with this problem. The most effective solution is to unplug or disconnect sensitive electronic devices, such as computers, VCRs and televisions when not in use for extended periods and particularly when a lightning storm is nearby. This however is usually unreliable since it is inconvenient and usually forgotten and in the case of modem refrigerators with electronic controls impractical.

U.S. Pat. No. 4,095,262 to St. Clair, for example is directed to protecting household appliances, such as a TV, for example, from surges caused by lightning, The apparatus includes a plurality of manually operated switches which may be connected for common operation. Accordingly, a user may manually switch the connections to isolate the equipment side conductors from the line and connect them to the chassis ground for protection. Unfortunately, the user must still remember to take the time to manually operate the switches prior to and after each use.

U.S. Pat. No. 6,104,582 to Cannon et al. is directed at transmitting a control signal that is generated by a weather service via telephone/modem lines or paging systems, to shut down computer equipment in the event that threatening weather conditions, are detected in the area of such equipment. This is a viable and sophisticated method, but one which requires an elaborate system and is limited to a certain coverage area.

It occurs to the inventor that, since a lightning strike is usually accompanied by thunder, and, since thunder can be heard three to four miles away from the actual site of the strike, it would be advantageous to detect the distinctive sound patterns of the thunder while potentially damaging lightning is still at a safe distance. This could be accomplished by utilizing available sound pattern recognition techniques. When the detected sounds are deemed to indicate a potentially threatening condition the connected equipment or appliances can be disconnected from the incoming conductors until the threat has passed.

U.S. Pat. No. 4,806,931 to Nelson is directed to compare sound patterns with previously stored patterns to identify certain sounds.

U.S. Pat. No. 6,038,118 to Eskildsen et al. is directed to compare the sound patterns of breaking glass with sound patterns stored in a processor to indicate an intrusion alarm when used in conjunction with an automatic security system.

SUMMARY OF THE INVENTION

In view of the foregoing background, it is therefore an object of the invention to provide and apparatus and associated method for protecting electrical and electronic equipment and appliances against potentially damaging disturbances carried to the equipment by external electrical conductors.

This and other objects, advantages and features of the invention are provided by a protection apparatus which in one embodiment is for the protection of a plurality of electrical equipment devices from electrical disturbances carried by external electrical conductors. The apparatus preferably comprises: a housing; means to connect the housing and internal circuitry to the external electrical conductors; a means of connecting external equipment to the housing for supply of electrical power and/or signals; a means of automatically or manually switching a plurality of devices from the normal operating state to the protected state; a multiple switching means to isolate the load side connected equipment from the line side conductors; the multiple switching means while in the protected state will connect all of the load side conductors to the chassis ground; one or more lights to indicate the present state of the apparatus.

The apparatus will also include a means of detecting sounds in the vicinity and comparing them to one or more sound patterns of thunder, which have been recorded or generated artificially and stored in a memory unit. If the detected sound pattern matches one or more of the stored patterns, thus indicating a thunder event and a potential threatening condition, the multiple switching means will transfer from the operating state to the protected state.

The apparatus may also have one or more timing devices, which will start a timing cycle upon confirmation of a thunder event. At the end of a specified time if the device has not detected any subsequent events the device will transfer the multiple switching device back to the normal operating state.

The apparatus may have one or more remote sensing units for use in instances when the equipment is in a location or a building where the outside sounds can not be picked up by the internal sensing unit.

The apparatus may have signal sending and receiving devices of the types used in X-10 units to facilitate remote activation of multiple switching devices, which are connected to a common electrical system.

BRIEF DESCRIPTION OF THE DRAWINGS

FIG. 1.1 is a front perspective view of the protection apparatus as connected to a TV or a computer.

FIG. 2.1 is a three view drawing of the preferred embodiment of the protection apparatus showing the front, top and left side views.

FIG. 3.1 is a drawing of an alternative embodiment of the protection apparatus when used as a multiple device protection apparatus.

FIG. 4.1 is a functional block diagram of the protection apparatus.

FIG. 4.2 is a schematic circuit diagram of the protection apparatus in the preferred embodiment.

DETAILED DESCRIPTION OF PREFERRED EMBODIMENTS

The invention will now be described more fully with reference to the accompanying drawings in which the preferred embodiments of the invention are shown. This invention may, however, be embodied in many different forms and should not be construed as limited the embodiments set forth herein. Rather, these embodiments are provided so that this disclosure will be through and complete, and will fully convey the scope of the invention to those skilled in the art.

Referring now to FIG. 1.1, the protection apparatus 11 consist of a housing 1 for containing components and means of connecting external electrical conductors to external sources of power and signal. Components contained within the apparatus consist of a mode selector switch 2 for selecting normal, off or bypass modes, a microphone or other audible sensing device 3 for detection the sounds in proximity to the apparatus, LED indicator lights 4 for displaying the status of the apparatus, telephone jacks 5 and coaxial cable jacks 6 for connecting line side signals or data to load side equipment and 110-volt power outlet(s) 7 for connecting line side power to load side equipment 12. Externally connected equipment is illustrated as commonly used electrical equipment such as a computer 9 or a TV receiver 10.

Further referring to FIG. 2.1 the apparatus contains standard electrical plug prongs 8 to connect the apparatus to an external power source via a standard 110-volt outlet.

When the protection apparatus is to be used to protect a plurality of devices from a single power source FIG. 3.1 illustrates the housing 1 being modified to accommodate a plurality of outlets 7. Further the power input prongs 8 are replaced with a power cord to connect the apparatus to the power source while allowing the apparatus to be placed in a more convenient location with respect to the connected equipment 12.

FIG. 4.1 shows in block diagram format the flow of electrical power and signals through the apparatus. AC power first enters the apparatus and is filtered by the surge suppressor 14. The AC power is then routed to the 12-volt DC power supply 15 and the isolating-switching means. The 110-volt AC power is converted to 12-volts DC in the power supply and then routed to the thunder detector 16 and the timer 17 circuits. The timer 17 circuit is controlled by an output from the thunder detector 16. The timer 17 supplies the 12-volt DC power to the isolating switching means 18. The 110-volt AC power and telephone/modem inputs are then routed to the external connected equipment through the power outlet 7 and the telephone/modem jacks 5 and 6.

Now referring primarily to FIG. 4.2, the electrical schematic, all components are shown with the mode selection switch S1 24 in the off position. Switch S1 24 is a three-position two-pole selector switch by which all contacts are open with the switch in the off position, one set of contacts is closed only in the "NORMAL" mode and the other set of contacts closed only in the "BYPASS" mode. When switch S1 is in the "OFF" position control relay CR1 25 and control relay CR2 26 are de-energized preventing the multiple switching means CR3 27 and CR4 28 from applying power or signal to the externally connected equipment 12. While in this state there are no LED indicator lights on.

With switch S1 in the "NORMAL" position contact "S1-$a$" is closed thus energizing the coil of CR1 25. This in turn allows AC power to the power supply and DC power to the thunder detector 22, the timer 23 and the green LED 29. In this mode the timer cycle is not yet activated and the normally closed contacts within allow current to energize the coil of the multi switching means 27 and 28 which allow power and signal to the connected equipment 12. In this state the connected equipment 12 is protected from surges by the surge suppression circuitry. While in this mode the thunder detection means 22 is constantly sampling for audible sounds and comparing those sound patterns to other patterns which are stored in it's memory. If a reasonable match is detected the assumption is made that there is a lightning storm close enough to the area to present a potentially dangerous condition to the connected equipment 12. At this point a signal is sent from the thunder detector circuitry 22 to the timer circuitry 23 which opens the circuit to the multiple switching means 27 and 28. The multiple switching means move to the protected state in which the connected equipment conductors are disconnected from the line side power and signal conductors and the load side conductors are connected to the chassis ground. The green LED is turned off and the red LED is turned on. At this point the timer begins a predetermined timing cycle. If another event is detected prior to the end of the timing cycle that cycle will be restarted from the beginning. If at the end of the timing cycle no other events have been detected the multiple switching means 27 and 28 will return to the normal operating mode.

With switch S1 in the "BYPASS" position contact S1-$b$ is closed which energizes control relay CR2 26. While in this mode the thunder detection feature is effectively bypassed and the multiple switching means 27 and 28 are held in the normal mode. The green LED 29 is turned off and the amber LED 30 is turned on. Since the primary feature of the invention, the thunder detector, is defeated in this mode it should be pointed out that this feature is presented only as an emergency means of forcing power to the connected equipment and should not be used unless the thunder detection feature is not desired at the time.

What is claimed is:

1. An apparatus for protection of electrical or electronic equipment from electrical disturbances carried by external electrical conductors, said apparatus comprising: a housing; means of connecting the apparatus with external electrical conductors; a power supply positioned within said housing for supplying power to the sensing and switching systems; a switching means positioned within said housing to switch between the protected state, the override state and the normal operating state; a sensing means positioned within said housing for detecting a disturbance deemed capable of effecting the connected electrical equipment.

2. A protection apparatus according to claim 1 further comprising a sensing means positioned within, or external to the housing which will sense the sounds in the vicinity of the connected equipment. Said sensing means will compare those sounds to sound patterns which have peen previously recorded or generated artificially and stored in a memory. If the sensed sound is deemed to match one or more of the stored sounds a threatening condition will be assumed and a multiple switching device will be activated.

3. A protection apparatus according to claim 1 further comprising power input means for receiving AC power from and AC power line, and wherein said power input means comprises surge suppression means for suppressing surges on the AC power line.

4. A protection apparatus according to claim 1 further comprising a power supply means for converting AC line power to DC power at a voltage level consistent with the requirements of the sensing systems employed within the apparatus.

5. A protection apparatus according to claim 1 further comprising a disturbance sensing means for sensing a loss of AC power.

6. A protection apparatus according to claim 3 wherein said surge suppression means comprises at least one metal oxide varistor.

7. A protection apparatus according to claim 1 further comprising signal sending and receiving means compatible with control X-10 devices.

* * * * *